United States Patent
Ahn

(10) Patent No.: US 11,142,155 B2
(45) Date of Patent: Oct. 12, 2021

(54) HORN PLATE ASSEMBLY FOR VEHICLE

(71) Applicants: HYUNDAI MOTOR COMPANY, Seoul (KR); KIA MOTORS CORPORATION, Seoul (KR)

(72) Inventor: Hyoung Jun Ahn, Daegu (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 251 days.

(21) Appl. No.: 16/556,811

(22) Filed: Aug. 30, 2019

(65) Prior Publication Data
US 2020/0247344 A1 Aug. 6, 2020

(30) Foreign Application Priority Data
Feb. 1, 2019 (KR) .................. 10-2019-0013200

(51) Int. Cl.
| G08B 23/00 | (2006.01) |
| B60R 21/203 | (2006.01) |
| B60Q 5/00 | (2006.01) |
| B62D 1/10 | (2006.01) |

(52) U.S. Cl.
CPC .............. *B60R 21/203* (2013.01); *B60Q 5/00* (2013.01); *B62D 1/10* (2013.01)

(58) Field of Classification Search
None
See application file for complete search history.

(56) References Cited

U.S. PATENT DOCUMENTS

| 6,332,793 | B1 * | 12/2001 | Hiura | B60R 16/027 439/164 |
| 2007/0132218 | A1 * | 6/2007 | Kim | B60R 21/217 280/731 |
| 2019/0351860 | A1 * | 11/2019 | Ohki | B60R 13/005 |
| 2020/0317123 | A1 * | 10/2020 | Osterfeld | B60R 16/027 |
| 2021/0039704 | A1 * | 2/2021 | Kiyohara | B62D 1/11 |

FOREIGN PATENT DOCUMENTS

KR 10-2012-0099860 A 9/2012

* cited by examiner

*Primary Examiner* — Julie B Lieu
(74) *Attorney, Agent, or Firm* — Morgan, Lewis & Bockius LLP

(57) ABSTRACT

A horn plate assembly for a vehicle includes: a horn plate having a plurality of fastening holes; and fasteners fastened to a hub of a steering wheel through the fastening holes. Seating grooves having stepped cross-sections to the fastening holes are formed at the fastening holes, and portions of the fasteners are seated in the seating grooves when the fasteners are fastened to the hub of the steering wheel.

5 Claims, 5 Drawing Sheets

--PRIOR ART--

HORN PLATE ASSEMBLY FOR VEHICLE

CROSS REFERENCE TO RELATED APPLICATION

The present application claims priority to Korean Patent Application No. 10-2019-0013200, filed Feb. 1, 2019 in the Korean Intellectual Property Office, the entire contents of which is incorporated herein for all purposes by this reference.

TECHNICAL FIELD

The present disclosure relates to a horn plate assembly for a vehicle, and more particularly, to a horn plate assembly for a vehicle capable of preventing movement of a horn plate which is bolted to a steering wheel.

BACKGROUND

A steering wheel is installed in a vehicle for a driver to perform operations of, for example, turning the vehicle. In general, a steering wheel includes a rim that is an outer edge, a hub at the center of the steering wheel, and a plurality of spokes connecting the rim and the hub.

In addition, a horn plate is mounted on the hub, and is combined with a driver airbag (DAB) module.

The horn plate is connected to the hub of the steering wheel by several bolts and return springs, in which the bolts are fastened to the hub through the horn plate and the return springs are supported at both ends by the horn plate and the hub.

Accordingly, when a driver presses the DAB module, the DAB module and the horn plate move down together toward the hub of the steering wheel, generating a contact point, whereby the horn is operated. Further, when a pressing force of the driver is removed, the driver airbag module and the horn plate are returned upward to the initial positions by a restoring force of the return springs.

Further, bolt holes for fastening bolts are formed at the horn plate, diameters of the bolt holes are generally greater than those of bolts for smooth movement of the horn plate. Accordingly, there are gaps between the bolt holes of the horn plate and bolts, the horn plate moves up and down, and left and right, and thus, durability is reduced by the movement of the horn plate.

The description provided above as a related art of the present disclosure is just for helping understand the background of the present disclosure and should not be construed as being included in the related art known by those skilled in the art.

SUMMARY

The present disclosure has been made in order to solve the above-mentioned problems with the prior art, and an aspect of the present disclosure is to provide a horn plate assembly for a vehicle, the horn plate assembly being able to remove gaps between a horn plate and bolts in a structure in which a horn plate is bolted to a steering wheel, and being able to improve durability by preventing movement of the horn plate.

A horn plate assembly for a vehicle according to an exemplary embodiment of the present disclosure may include: a horn plate having a plurality of fastening holes; and fasteners fastened to a hub of a steering wheel through the fastening holes, in which seating grooves having stepped cross-sections to the fastening holes are formed at the fastening holes, and portions of the fasteners are seated in the seating grooves when the fasteners are fastened to the hub of the steering wheel.

The seating grooves may have a larger diameter than the fastening holes at inlet edges of the fastening holes, and ends of the fasteners may be inserted in the seating grooves.

When portions of the fasteners are inserted and seated in the seating grooves, the seating grooves and the fasteners may come in close contact with each other without a gap between the seating grooves and the fasteners, and the horn plate may be prevented from moving up and down and left and right by close contact between the seating grooves and the fasteners.

The fasteners may be bolts each having a threaded-portion and a head, and a protrusion that is inserted and seated in the seating groove may be integrally formed on a side of the head.

Outer edges of the protrusions may be chamfers.

According to the exemplary embodiment of the present disclosure, the seating grooves are formed at the bolt holes of the horn plate and the protrusions are formed at the heads of the bolts, so that the protrusions are inserted and seated in the seating grooves when the heads of the bolts are thread-fastened to the hub of the steering wheel, and the bolts and the horn plate can be brought completely in close contact with each other. Further, as the bolts and the horn plates are brought completely in close contact with each other, gaps between the bolts and the horn plate can be removed. Therefore, it is possible to prevent a DAB module, including the horn plate, from unnecessarily moving up and down and left and right, and thus, it is possible to prevent unnecessary noise and improve durability.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
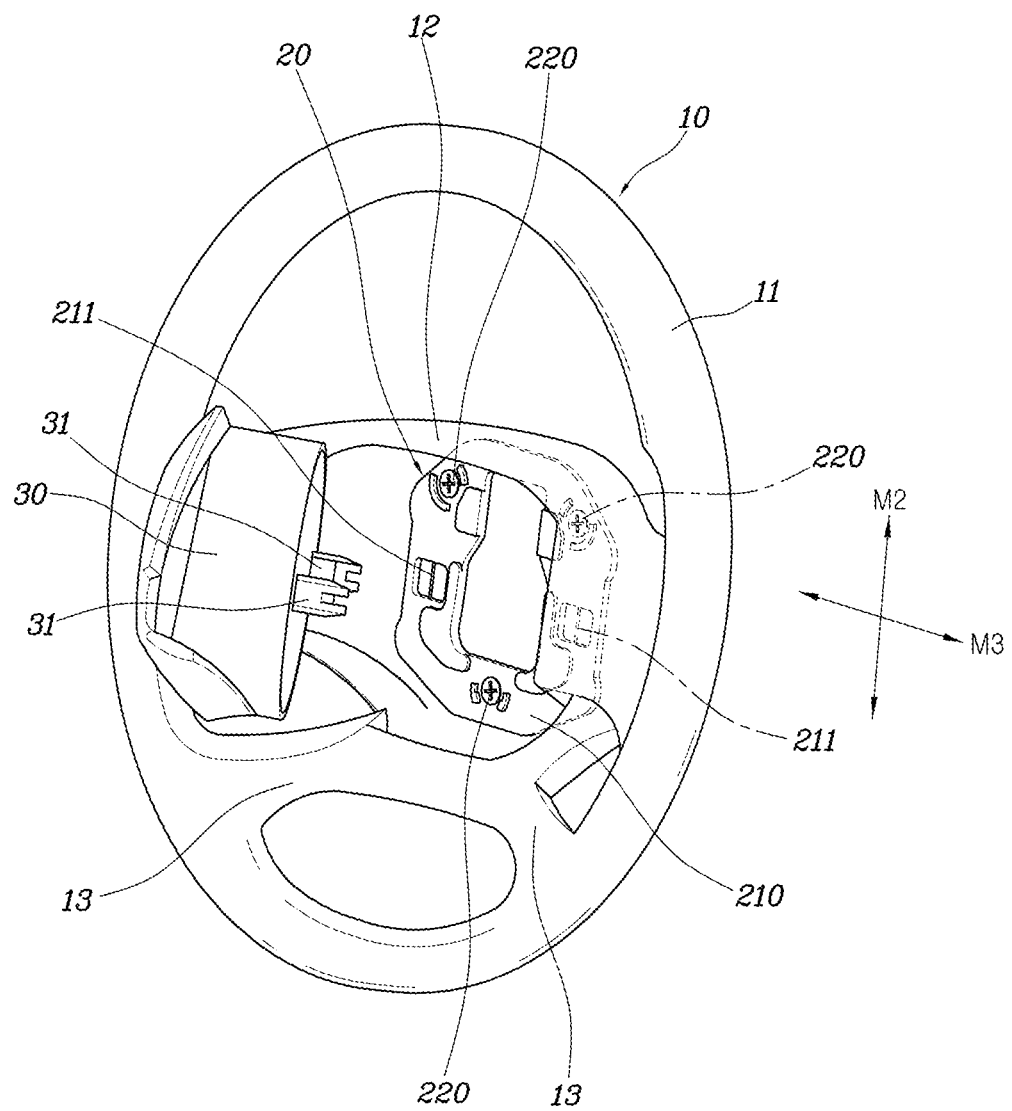
FIG. 1 is a view showing the state in which a horn plate assembly for a vehicle according to an exemplary embodiment of the present disclosure has been combined with a steering wheel.
Figure 2:
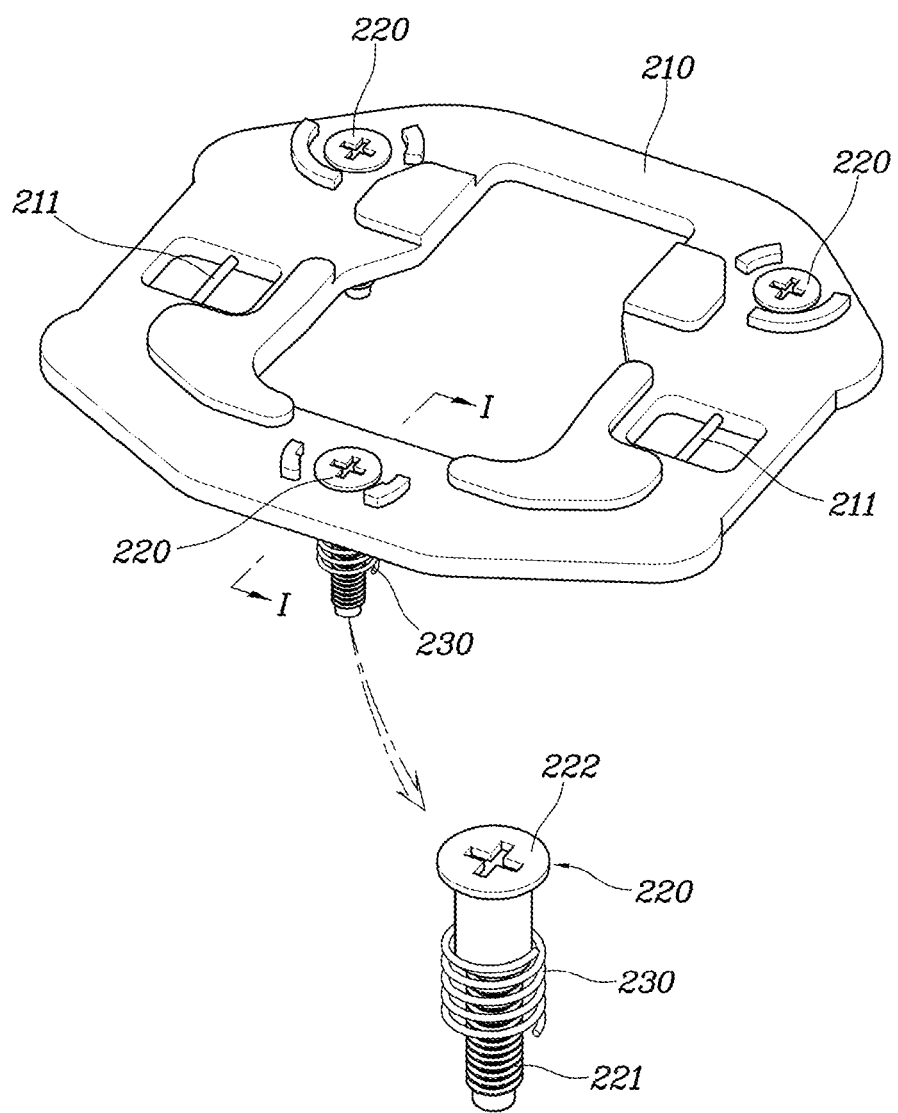
FIG. 2 is a perspective view of the horn plate assembly according to an exemplary embodiment of the present disclosure.
Figure 3:
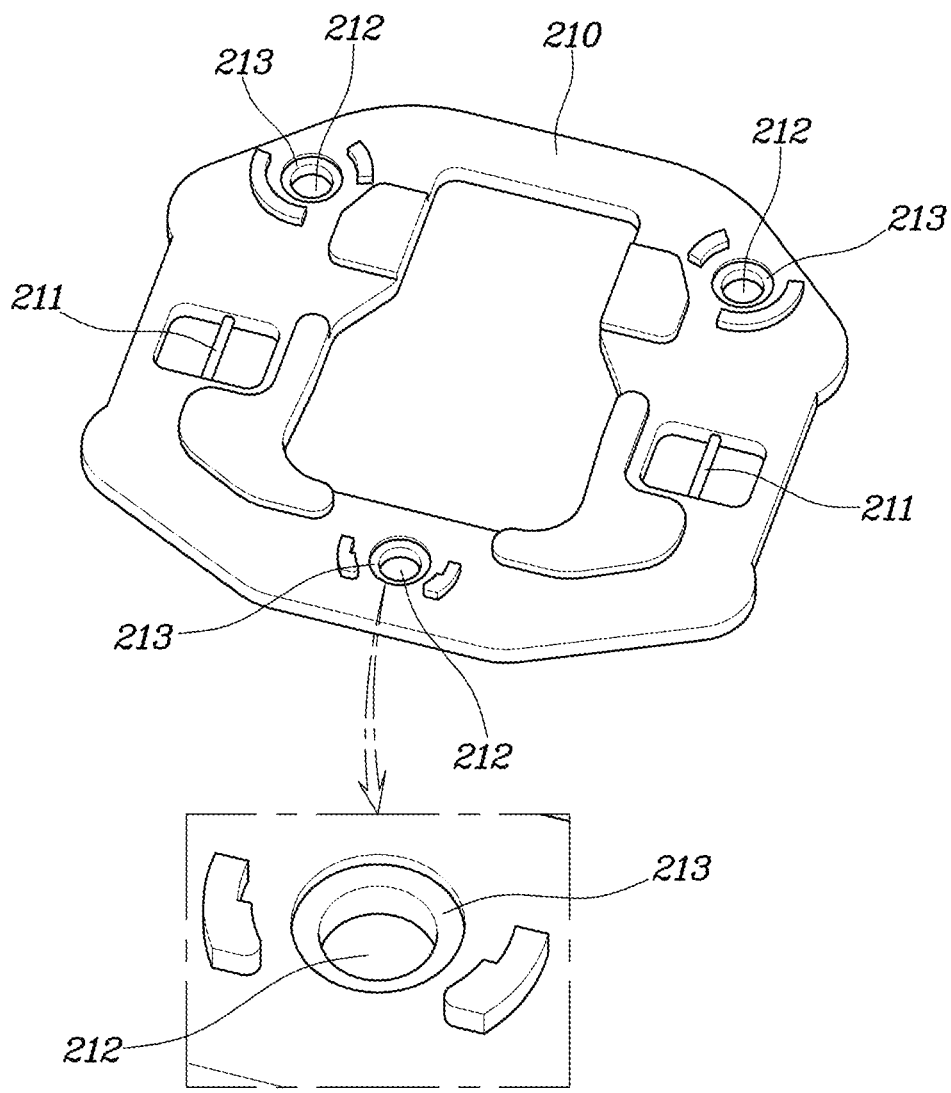
FIG. 3 is a perspective view of a horn plate according to an exemplary embodiment of the present disclosure.

A horn plate assembly for a vehicle according to exemplary embodiments of the present disclosure is described hereafter in detail with reference to the accompanying drawings.

As shown in FIGS. 1 to 4, an automotive steering wheel 10 configured to be operated by a driver includes a rim 11 that is an outer edge, a hub 12 at the center, and a plurality of spokes 13 connecting the rim 11 and the hub 12.

A horn plate assembly 20 according to an exemplary embodiment of the present disclosure is coupled to the hub 12 of the steering wheel 10, and a driver airbag (DAB) module 30 is coupled to the horn plate assembly 20.

The horn plate assembly 20 includes a horn plate 210, a plurality of fasteners 220, and return springs 230 provided respectively for the fasteners 220.

Two wires 211 are disposed with a predetermined distance from each other at the left and right sides on the horn plate 210 and two hooks 31 are disposed with a predetermined distance from each other at the left and right sides on the DAB module 30, so that the hooks 31 are fitted on the wires 211, whereby the DAB module 30 is coupled to the horn plate 210.

A plurality of fastening holes 212 are formed through the horn plate 210, the fasteners 220 are inserted through the fastening holes 212, and the fasteners 220 disposed through the fastening holes 212 are thread-fastened to the hub 12 of the steering wheel 10.

The return springs 230 are fitted on the fasteners 220, respectively, so that when the fasteners 220 are fastened to the hub 12 of the steering wheel 10, both ends of the return springs 230 are elastically supported by the bottom of the horn plate 210 and the hub 12.

The fastening holes 212 formed at the horn plate 210 are bolt holes and the fasteners 220 inserted through the bolt holes are bolts. Hereinafter, bolt holes and bolts are exemplified in the following description.

When a driver presses down the DAB module 30, the DAB module 30 and the horn plate 210 are moved down together toward the hub 12 of the steering wheel 10 (in the downward direction of the arrow M1 in FIG. 4) and a contact point is generated, so that a horn can be operated. Further, when the pressing force of the driver is removed, the DAB module 30 and the horn plate 210 are returned upward to the initial positions (in the upward direction of the arrow M1 in FIG. 4) by a restoring force of the return springs 230.

In order to smoothly move the horn plate 210 (arrow M1) that is operated by a driver for operating a horn, the bolt holes 212 formed at the horn plate 210 are usually made larger in diameter than the bolts 220.

If the bolt holes 212 and the bolts 220 have the same diameters and the bolts 220 and the bolt holes 212 interfere with each other, even though a driver presses down the DAB module 30, the horn plate 210 cannot be moved (in the direction of the arrow M1 in FIG. 4), so that the horn is not operated. Accordingly, the bolt holes 212 are usually formed larger in diameter than the bolts 220 to prevent this problem.

The structure according to the present disclosure is a structure that can prevent gaps between the bolts 220 and the horn plate 210 when the bolt holes 212 are larger in diameter than the bolts 220, thereby preventing unnecessary movement of the horn plate 210.

Figure 4:
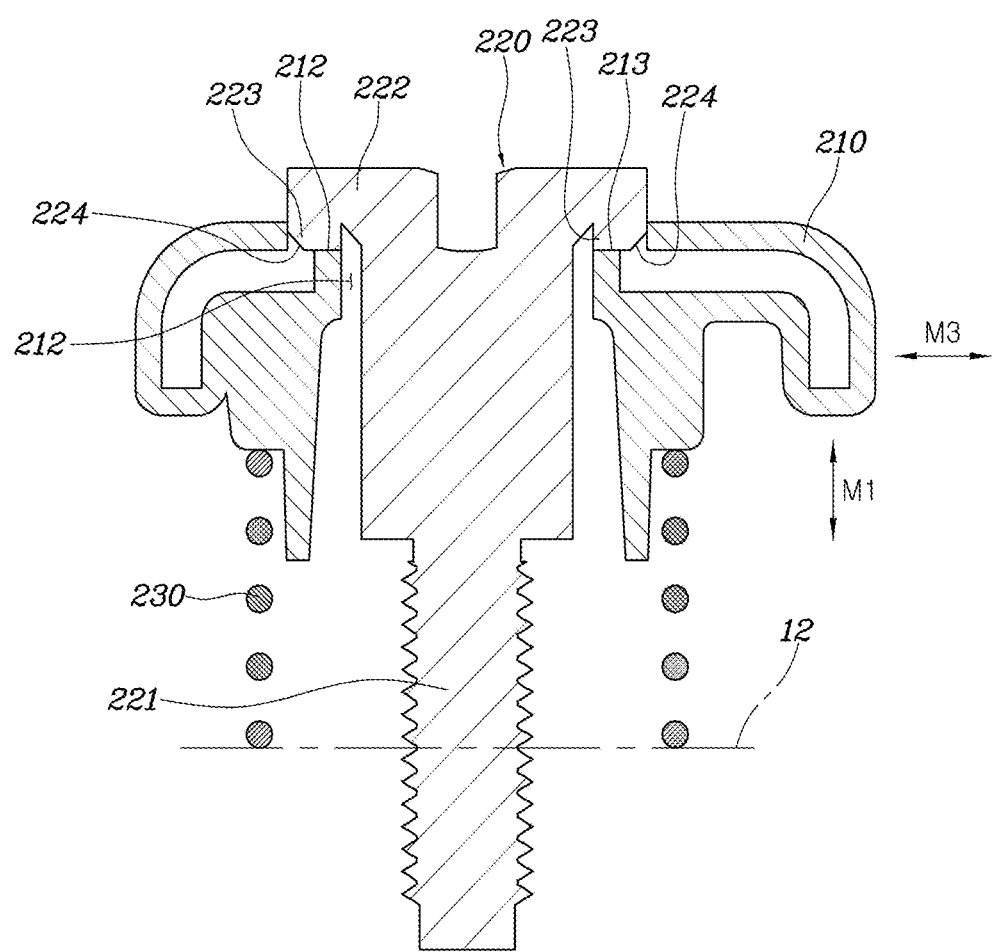
FIG. 4 is a cross-sectional view taken along line I-I of FIG. 2 for describing the horn plate assembly according to an exemplary embodiment of the present disclosure.

That is, as shown in FIG. 4, a seating groove 213 having a larger diameter than a bolt hole 212 formed at the horn plate 210 is formed at the inlet edge of the bolt hole 212 such that a portion of a bolt 220 is inserted and seated in the seating groove 213 when the bolt 220 is thread-fastened to the hub 12 of the steering wheel 10.

The bolt 220 has a threaded portion 221 that is thread-fastened to the hub 12 of the steering wheel 10 and a head 222 integrally formed at an end of the threaded portion 221, and a protrusion 223 is integrally formed on the bottom of the head 222, so that the protrusion 223 is inserted and seated in the seating groove 213 formed at the bolt hole 212 of the horn plate 210.

The bolt hole 212 and the seating groove 213 are connected to each other to form a stepped cross-section.

Since the protrusions 223 formed at the heads 222 of the bolts 220 are inserted and seated in the seating grooves 213 formed at the bolt holes 212 of the horn plate 210 when the threaded portions 221 of the bolts 220 are thread-fastened to the hub 12 of the steering wheel 10, the seating grooves 213 and the heads 222 of the bolts 220, and the seating grooves 213 and the protrusions 223 are completely in close contact with each other, so that gaps are not generated therebetween. Accordingly, the horn plate 210 and the DAB module 30 coupled to the horn plate 210 do not move up/down (in the direction of the arrow M2 in FIG. 1) and left/right (in the direction of the arrow M3 in FIG. 1).

As described above, as the DAB module 30 including the horn plate 210 is prevented from moving up/down (in the direction of the arrow M2) and left/right (in the direction of the arrow M3), it is possible to prevent unnecessary noise and also improve durability.

According to the structure of the present disclosure, the outer edges of the protrusions 223 of the heads 222 of the bolts 220 are chamfers 224, so that the protrusions 223 can be more smoothly inserted into the seating grooves 213 when the threaded portions 221 of the bolts 220 are thread-fastened to the hub 12 of the steering wheel 10.

Figure 5:
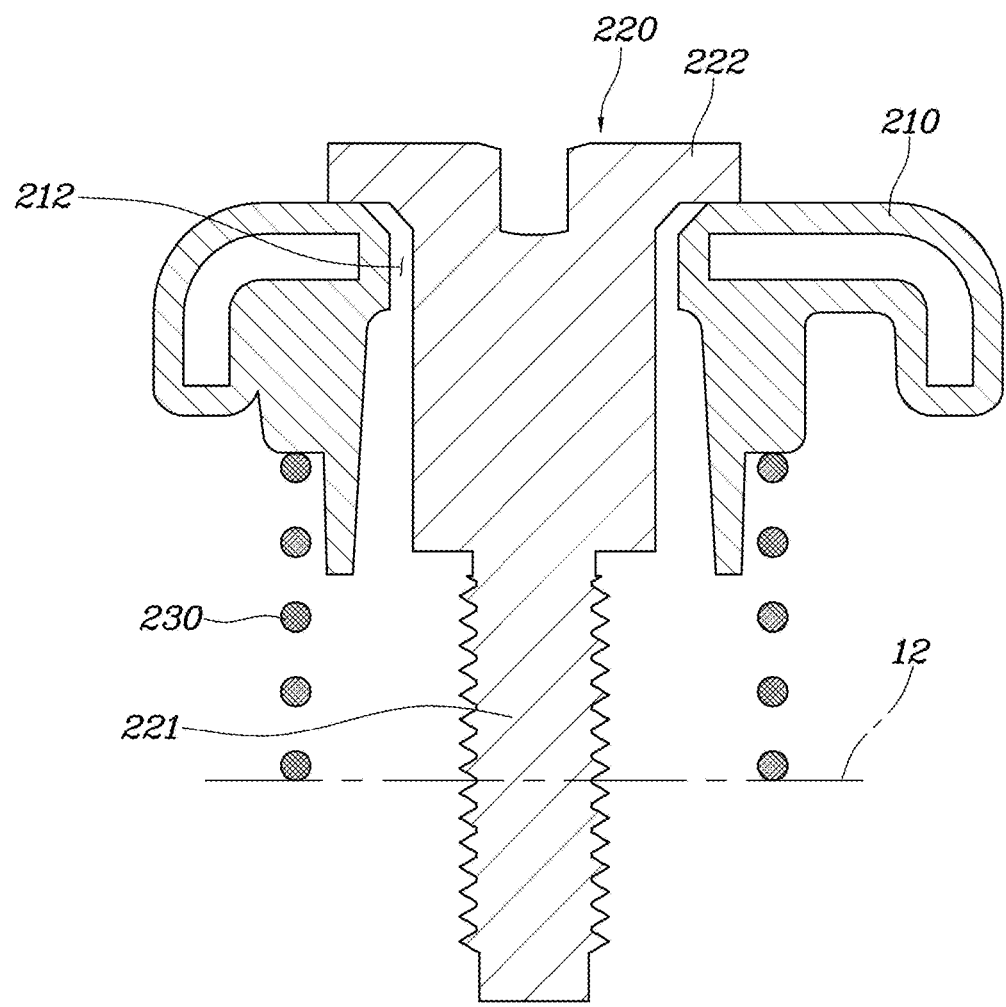
FIG. 5 is a cross-sectional view for describing a structure of the related art corresponding to FIG. 4.

A structure of the related art is exemplified in FIG. 5, in which a bolt hole 212 formed on a horn plate 210 is formed to be larger in diameter than a bolt 220 and a head 222 of the bolt 220 is simply in contact with the top of the horn plate 210. According to this structure, it is impossible to remove the gap between the bolt 220 and the horn plate 210, so that not only are the horn plate 210 and the DAB module 30 unnecessarily moved up and down and left and right, but noise is also generated and durability is correspondingly deteriorated.

As described above, according to an exemplary embodiment of the present disclosure, the seating grooves 213 are formed at the bolt holes 212 of the horn plate 210 and the protrusions 223 are formed at the heads 222 of the bolts 220, and the protrusions 223 are inserted and seated in the seating grooves 213 when the heads 221 of the bolts 220 are thread-fastened to the hub 12 of the steering wheel 10, so that the bolts 220 and the horn plate 210 can be completely in close contact with each other. Further, as the bolts 220 and the horn plates 210 are completely in close contact with each other, gaps between the bolts 220 and the horn plate 210 can be removed. Therefore, it is possible to prevent the DAB module 30, including the horn plate 210, from unnecessarily moving up and down and left and right, so that it is possible to prevent unnecessary noise and improve durability.

Although the present disclosure has been described with reference to specific embodiments shown in the drawings, it is apparent to those skilled in the art that the present disclosure may be changed and modified in various ways without departing from the scope of the present disclosure, which is described in the following claims.

What is claimed is:

1. A horn plate assembly for a vehicle, comprising:
a horn plate having a plurality of fastening holes; and
fasteners fastened to a hub of a steering wheel through the fastening holes,
wherein seating grooves having stepped cross-sections to the fastening holes are formed at the fastening holes, and
portions of the fasteners are seated in the seating grooves when the fasteners are fastened to the hub of the steering wheel.

2. The horn plate assembly of claim 1, wherein the seating grooves have a larger diameter than that of the fastening holes at inlet edges of the fastening holes, and ends of the fasteners are inserted in the seating grooves.

3. The horn plate assembly of claim 1, wherein when portions of the fasteners are inserted and seated in the seating grooves, the seating grooves and the fasteners come in close contact with each other without a gap between the seating grooves and the fasteners, and the horn plate is prevented from moving up and down and left and right by close contact between the seating grooves and the fasteners.

4. The horn plate assembly of claim 1, wherein the fasteners are bolts each of which having a threaded-portion and a head, and a protrusion, which is inserted and seated in the seating groove, is integrally formed on a side of the head.

5. The horn plate assembly of claim 4, wherein outer edges of the protrusions are chamfers.

* * * * *